(12) United States Patent
Yu

(10) Patent No.: US 8,873,019 B2
(45) Date of Patent: Oct. 28, 2014

(54) MANUFACTURING AND DETECTING DEVICE AND METHOD OF BIREFRINGENT LENS GRATING

(75) Inventor: Bin Yu, Shenzhen (CN)

(73) Assignee: Superd Co. Ltd., Shenzhen (CN)

( * ) Notice: Subject to any disclaimer, the term of this patent is extended or adjusted under 35 U.S.C. 154(b) by 618 days.

(21) Appl. No.: 12/905,988

(22) Filed: Oct. 15, 2010

(65) Prior Publication Data

US 2012/0003380 A1 Jan. 5, 2012

(30) Foreign Application Priority Data

Jul. 1, 2010 (CN) .......................... 2010 1 0225089

(51) Int. Cl.
  *G02F 1/13* (2006.01)
  *G02B 5/30* (2006.01)
  *G02B 3/00* (2006.01)
  *G02B 27/22* (2006.01)

(52) U.S. Cl.
  CPC ............ *G02B 5/3083* (2013.01); *G02B 3/0031* (2013.01); *G02B 3/0037* (2013.01); *G02B 27/2214* (2013.01)
  USPC ................................ 349/201; 349/15; 349/95

(58) Field of Classification Search
  USPC ........................................................ 349/201
  See application file for complete search history.

(56) References Cited

U.S. PATENT DOCUMENTS

| | | | | |
|---|---|---|---|---|
| 5,554,251 A | * | 9/1996 | Watanabe et al. | 156/379.8 |
| 5,583,609 A | * | 12/1996 | Mizutani et al. | 355/46 |
| 6,108,063 A | * | 8/2000 | Yuuki et al. | 349/95 |
| 6,564,166 B1 | * | 5/2003 | Ume et al. | 702/136 |
| 2006/0176541 A1 | * | 8/2006 | Woodgate et al. | 359/237 |
| 2006/0268413 A1 | * | 11/2006 | Kawasaki et al. | 359/569 |

FOREIGN PATENT DOCUMENTS

| | | | | |
|---|---|---|---|---|
| CN | 101287144 | * | 10/2008 | H04N 13/00 |
| JP | 2008-203042 | * | 9/2008 | G01N 13/10 |

OTHER PUBLICATIONS

CN 101287144 to Gu et al. (The english abstract).*
CN 101287144 to Gu et al. (The english detailed description).*

* cited by examiner

*Primary Examiner* — Lauren Nguyen
*Assistant Examiner* — Anthony G Quash
(74) *Attorney, Agent, or Firm* — Anova Law Group, PLLC

(57) ABSTRACT

The present disclosure provides a detecting device of a birefringent lens grating. The detecting device includes a projection pattern disposed adjacent to the birefringent lens grating; an illuminating light source for projecting light onto the projection pattern and the birefringent lens grating; an image capturing device for capturing the light out from the birefringent lens grating and obtaining a projection pattern image of the projection pattern; and a controller for comparing the projection pattern image with a reference to determine a refractive index matching degree of the birefringent lens grating. The present disclosure further provides a detecting method, a manufacture method and a manufacture device of the birefringent lens grating.

13 Claims, 4 Drawing Sheets

MANUFACTURING AND DETECTING DEVICE AND METHOD OF BIREFRINGENT LENS GRATING

CROSS REFERENCE TO RELATED APPLICATION

This application claims priority from China Patent Application No. 201010225089.3, filed on Jul. 1, 2010, the contents of which are hereby incorporated by reference in their entirety for all purposes.

TECHNICAL FIELD

The present disclosure relates to a manufacturing process of an optical element, and more particularly to a manufacturing and detecting device and method of a birefringent lens grating.

BACKGROUND

A birefringent lens grating is an essential element of a 2D/3D switching stereoscopic display. The birefringent lens grating generally comprises a lens array substrate and a liquid crystal material layer. The liquid crystal material layer is one kind of birefringent material. In particular, the liquid crystal material layer has a refractive index $n_o$ to ordinary light and has a refractive index $n_e$ to extraordinary light. The lens array substrate preferably is one kind of monorefringent material having a refractive index $n_p$. In a manufacturing process of the birefringent lens grating, it is needed to ensure one of the refractive index $n_e$ and the refractive index $n_o$ of the liquid crystal material layer to match with the refractive index $n_p$ of the lens array substrate so that light having a first linear polarization direction may pass through an interface of the liquid crystal material layer and the lens array substrate without any deflection, and light having a second linear polarization direction different from the first linear polarization direction may undergo deflection when it passes through the interface of the liquid crystal material layer and the lens array substrate.

Therefore, how to determine a refractive index matching degree of the liquid crystal material layer and the lens array substrate is essential to the birefringent lens grating.

BRIEF SUMMARY OF THE PRESENT DISCLOSURE

According to an embodiment of the present disclosure, there is provided a manufacturing device of a birefringent lens grating comprising a lens array substrate and a liquid crystal material layer contacting with the lens array substrate. The manufacturing device comprises: an object table for supporting the birefringent lens grating; a curing radiation source for curing the liquid crystal material layer; a temperature regulator for regulating a curing temperature of the liquid crystal material layer; a projection pattern disposed adjacent to the birefringent lens grating; an illuminating light source for projecting light onto the projection pattern and the birefringent lens grating; an image capturing device for capturing the light out from the birefringent lens grating and obtaining a projection pattern image of the projection pattern; and a controller for comparing the projection pattern image with a reference to control the temperature regulator to regulate the curing temperature according to the comparison of the projection pattern image with the reference.

According to an embodiment of the present disclosure, there is provided a manufacturing method of a birefringent lens grating comprising a lens array substrate and a liquid crystal material layer contacting with the lens array substrate. The manufacturing method comprises: providing the birefringent lens grating; disposing a projection pattern adjacent to the birefringent lens grating; projecting light onto the projection pattern and the birefringent lens grating; capturing the light out from the birefringent lens grating and obtaining a projection pattern image of the projection pattern; and comparing the projection pattern image with a reference to regulate a curing temperature of the liquid crystal material layer according to the comparison of the projection pattern image with the reference.

According to an embodiment of the present disclosure, there is provided a birefringent lens grating. The detecting device comprises: a projection pattern disposed adjacent to the birefringent lens grating; an illuminating light source for projecting light onto the projection pattern and the birefringent lens grating; an image capturing device for capturing the light out from the birefringent lens grating and obtaining a projection pattern image of the projection pattern; and a controller for comparing the projection pattern image with a reference to determine a refractive index matching degree of the birefringent lens grating.

According to an embodiment of the present disclosure, there is provided a detecting method of a birefringent lens grating. The detecting method comprises: providing the birefringent lens grating; disposing a projection pattern adjacent to the birefringent lens grating; projecting light onto the projection pattern and the birefringent lens grating; capturing the light out from the birefringent lens grating and obtaining a projection pattern image of the projection pattern; and comparing the projection pattern image with a reference and determining a refractive index matching degree of the birefringent lens grating.

BRIEF DESCRIPTION OF THE DRAWINGS

Embodiments of apparatus and method in accordance with the present disclosure will now be described, by way of example, with reference to the accompanying drawings, in which.

Figure 1:
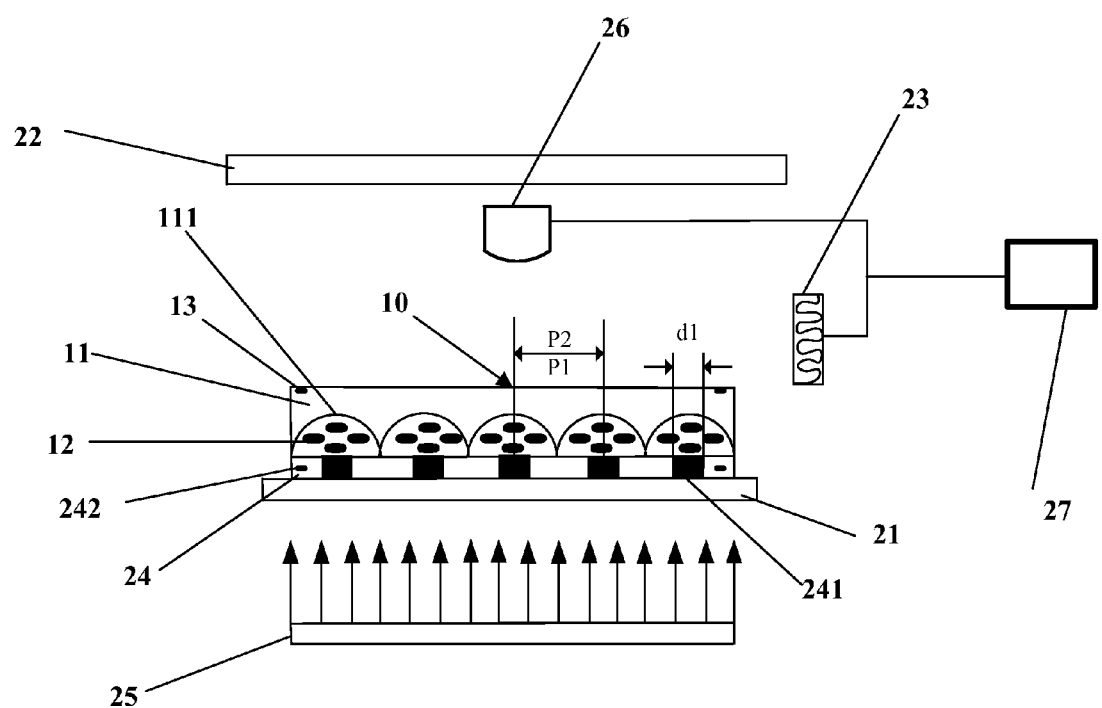
FIG. 1 is a block diagram of a manufacturing device of a birefringent lens grating according of a preferred embodiment of the present disclosure.

It should be understood that the Figures are merely schematic and are not drawn to scale. In particular, certain dimensions may have been exaggerated whilst other dimensions may have been reduced. It should also be understood that the same reference numerals are used throughout the Figures to indicate the same or similar parts.

DETAILED DESCRIPTION OF EMBODIMENTS

Referring to FIG. 1, a block diagram of a manufacturing device of a birefringent lens grating according to a preffered embodiment of the present disclosure is shown. In this embodiment, the birefringent lens grating 10 may comprise a lens array substrate 11 and a liquid crystal material layer 12 contacting with the lens array substrate 11. The lens array substrate 11 may be arranged with an array of grooves having a groove pitch P1 and comprising a plurality of cylindrical grooves 111 which are parallel to each other. The liquid crystal material layer 12 may be filled into the cylindrical grooves 111 and may comprise a plurality of liquid crystal molecules aligned in an aligning direction through a rubbing alignment process or an electric field alignment process.

The manufacturing device may comprise an object table 21, a curing radiation source 22 and a temperature regulator 23. The object table 21 may be used to support the birefringent lens grating 10. The curing radiation source 22 may be used to provide curing radiation having a wavelength, for example UV light, in order to curing the liquid crystal material layer 12 of the birefringent lens grating 10. The temperature regulator 23 may be used to regulate a curing temperature of the liquid crystal material layer 12. In this embodiment, the temperature regulator 23 preferably keeps the curing temperature between 20° C. and 40° C., and regulates the curing temperature according to requirement.

The manufacturing device may further comprise a projection pattern 24, an illuminating light source 25, an image capturing device 26 and a controller 27. The projection pattern 24 may be disposed adjacent to the birefringent lens grating 10. The projection pattern 24 may comprise an array of lines having a line pitch P2 which may be equal to the groove pith P1 and comprising a plurality of shielding or transmitting lines 241 which are parallel to each other. Each of the shielding or transmitting lines 241 may have a line width d1 which is smaller than the groove pith P1. The projection pattern 24 may be formed through a film developing process. The shielding or transmitting lines 241 and the cylindrical groove 111 may be arranged correspondingly and extend in a same extending direction. In addition, each of the shielding or transmitting lines 241 may have a center aligned with that of each of the cylindrical grooves 111, respectively.

The illuminating light source 25 may be used to project light onto the projection pattern 24 and the birefringent lens grating 10. The lens array substrate 11 has a first refractive index to the light, and a liquid crystal material layer 12 has a second refractive index to the light. The illuminating light source 25 preferably project parallel light having a linear polarization direction onto the projection pattern 24 and the birefringent lens grating 10. The illuminating light source 25 may project the light having various linear polarization directions according to the first refractive index of the lens array substrate 11 and the second refractive index of the liquid crystal material layer 12 as well as design requirement. For example, the light may have a linear polarization direction perpendicular to or parallel to the optical axis of the liquid crystal molecules of the liquid crystal material layer 12.

The image capturing device 26 may be used to capture the light out from the birefringent lens grating 10 and obtain a projection pattern image of the projection pattern 24. The object table 21 preferably is a transparent object table 21. The illuminating light source 25 and the image capturing device 26 are arranged on opposite sides of the transparent object table 21. The projection pattern 24 is arranged between the transparent object table 21 and the birefringent lens grating 10. Preferably, the projection pattern 24 may be arranged with a first aligning mark 242 and the birefringent lens grating 10 may be arranged with a second aligning mark 13 corresponding to the first aligning mark 242. The first aligning mark 242 and the second aligning mark 13 may be used to ensure that the projection pattern 24 and the birefringent lens grating 10 may be precisely aligned with each other.

The illuminating light source 25 may be used to project the light onto the projection pattern 24. The light may be shielded or transmitted by the shielding or transmitting lines 241 so that only a portion of the light may be transmitted by the projection pattern 24. The portion of light transmitted by the projection pattern 24 is further projected onto the birefringent lens grating 10. The portion of light may be arranged to pass through the birefringent lens grating 10 without any deflection if the second refractive index of the liquid crystal material layer 12 is equal to the first refractive index of the lens array substrate 11. The projection pattern image captured by the image capturing device 26 may thus have an image width same with that of a projection pattern image captured by the image capturing device 26 without the birefringent lens grating 10. Furthermore, the image width of the projection pattern image is equal to the line width of the shielding or transmitting lines 241 in the case that the light is parallel light having a linear polarization direction. The light may be arranged to undergo deflection if there is a difference between the second refractive index of the liquid crystal material layer 12 and the first refractive index of the lens array substrate 11. The projection pattern image captured by the image capturing device 26 thus has an image width different from that of a projection pattern image captured by the image capturing device 26 without the birefringent lens grating 10. Moreover, the image width of the projection pattern image will be different from the line width of the shielding or transmitting lines 241 in the case that the light is parallel light having a linear polarization direction.

The controller 27 may be used to compare the projection pattern image captured by the image capturing device 26 with a reference which is pre-stored in the controller 27 and determine a matching degree between the second refractive index of the liquid crystal material layer 12 and the first refractive index of the lens array substrate 11 according to the comparison. The controller 27 may be further used to control the temperature regulator 23 to regulate the curing temperature of the liquid crystal material layer 12. The second refractive index and the matching degree will change as the regulation of the curing temperature.

In general, the second refractive index of the liquid crystal material layer 12 may have a refractive index difference before and after curing of the liquid crystal material layer 12. However, the second refractive index of the liquid crystal material layer 12 substantially remains unchanged before and after curing under the curing temperature of 20° C. to 40° C. In a preferred embodiment, an image width of a projection pattern image which should be captured by the image capturing device 26 in the case that the refractive index difference is equal to a difference of the first refractive index and the second refractive index before the curing of the liquid crystal material layer 12 may be calculated and stored into the controller 27 as the reference according to the line width of the shielding or transmitting lines 241, the refractive index difference, the first refractive index, and the principle of optical imaging. In practice, before curing of liquid crystal material layer 12, the curing temperature of the liquid crystal material layer 12 may be regulated so that the image width of the projection pattern image which is actually captured by the image capturing device 26 remains equal to the reference, and thus the refractive index difference of the second refractive index before and after curing of liquid crystal material layer 12 remains equal to the difference of the second refractive index of the liquid crystal material layer 12 and the first refractive index of the lens array substrate 11 before curing liquid crystal material layer 12. By this means, the second refractive index of liquid crystal material layer 12 will change to be equal to the first refractive index of the lens array substratell after the curing of the liquid crystal material layer 12.

In another embodiment, the light projected by the illuminating light source 25 also may be unparallel light or nonlinear polarized light. When the light projected by the illuminating light source 25 is nonlinear polarized, for example, natural light, a polarization analyzer may be arranged on the image capturing device 26 in order to form a projection pattern image with the light having a polarization direction same with that of the polarization analyzer. In another embodiment, an intensity distribution of a projection pattern image formed with the natural light can be detected and compared with an intensity distribution reference to determine the refractive index matching degree of the liquid crystal material layer 12 and the lens array substrate 11. When the light projected by the illuminating light source 25 is unparallel light, the projection pattern image formed with the unparallel light will be compared with a reference which is set according to a divergent angle of the unparallel light.

In another embodiment, the projection pattern 24 may be arranged in any appropriate place between the illuminating light source 25 and the birefringent lens grating 10 or between the birefringent lens grating 10 and the image capturing device 26, as long as the matching degree of the second refractive index of the liquid crystal material layer 12 and the first refractive index of the lens array substrate 11 may be determined through comparing the projection pattern image and the reference.

Figure 2:
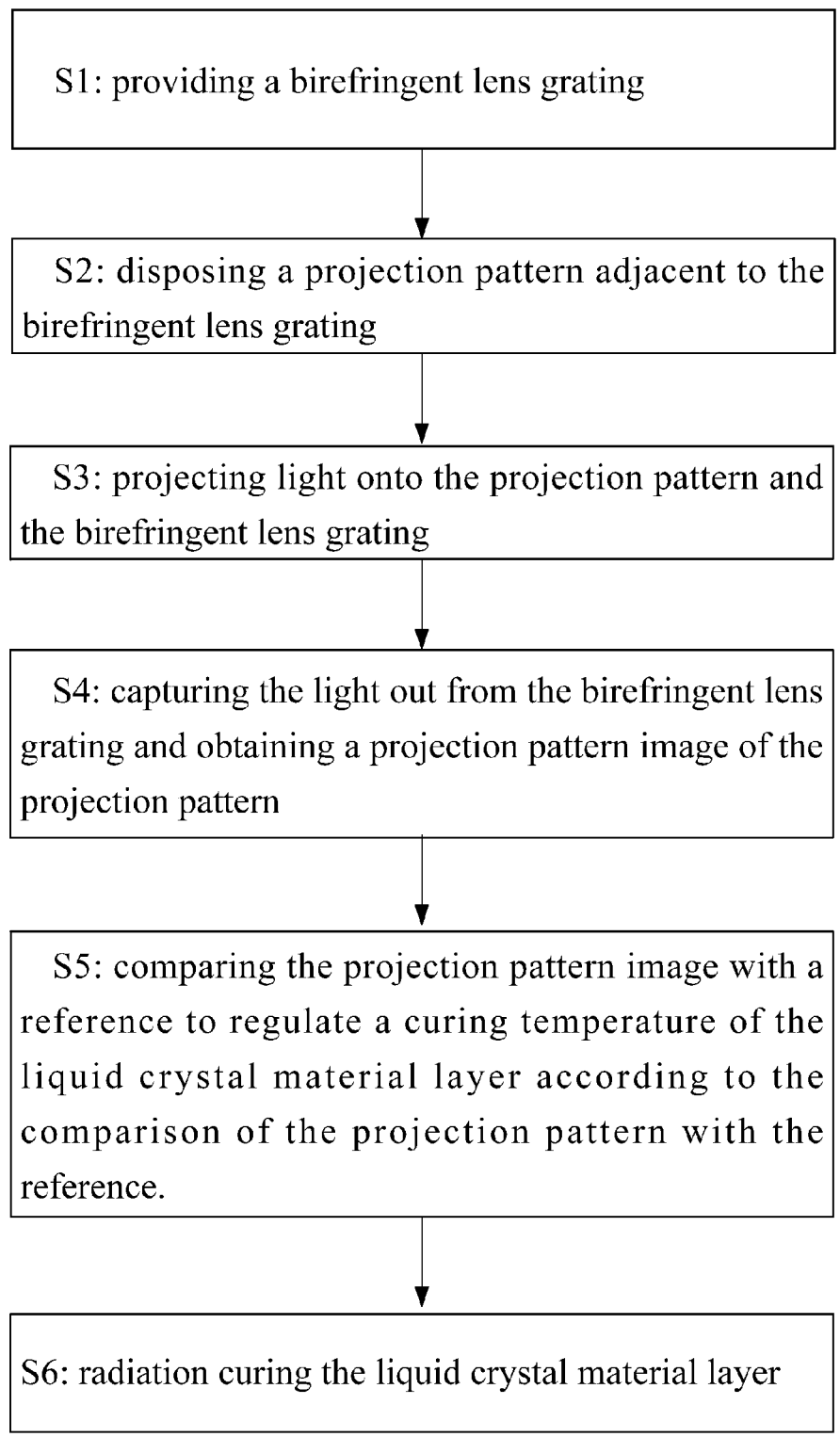
FIG. 2 is a flow chart of a manufacturing method of a birefringent lens grating according of a preferred embodiment of the present disclosure.

Referring to FIG. 2, a flow chart of a manufacturing method of a birefringent lens grating according to a preffered embodiment of the present disclosure is shown. In this embodiment, in step S1, a birefringent lens grating 10 shown in FIG. 1 is provided. The birefringent lens grating 10 comprises a lens array substrate 11 and a liquid crystal material layer 12 contacting with the lens array substratell. In step S2, a projection pattern 24 shown in FIG. 1 is disposed adjacent to the birefringent lens grating 10. The structure and arrangement of the birefringent lens grating 10 and the projection pattern 24 are substantially same with the embodiment described above. In step S3, an illuminating light source 25 shown in FIG. 1 is used to project light onto the projection pattern 24 and the birefringent lens grating 10. The lens array substrate 11 has a first refractive index to the light, and a liquid crystal material layer 12 has a second refractive index to the light. In step S4, an image capturing device 26 shown in FIG. 1 is used to capture the light out from the birefringent lens grating 10 and obtaining a projection pattern image of the projection pattern 24. In step S5, a controller 27 shown in FIG. 1 is used to compare the projection pattern image with a reference to regulate a curing temperature of the liquid crystal material layer 12 according to the comparison. In step S6, a curing radiation source 22 shown in FIG. 1 is used to radiation curing the liquid crystal material layer 12 under the regulated curing temperature.

The present disclosure further provides a detecting device and method of a birefringent lens grating.

Figure 3:
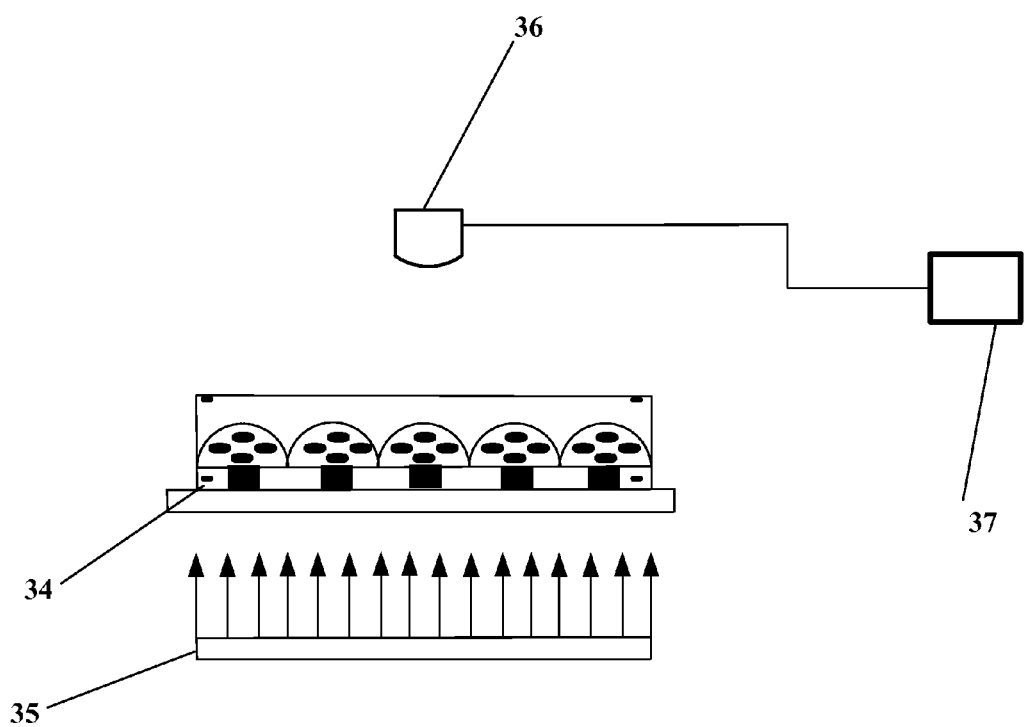
FIG. 3 is a block diagram of a detecting device of a birefringent lens grating according of a preferred embodiment of the present disclosure.

Referring to FIG. 3, a detecting device of a birefringent lens grating according to an embodiment of the present disclosure is shown. In this embodiment, the detecting device comprises a projection pattern 34, an illuminating light source 35, an image capturing device 36, and a controller 37. The detecting device shown in FIG. 3 is substantially same with the manufacturing device shown in FIG. 1, except that the controller 37 is not used to a curing temperature of the liquid crystal material layer and is used to determine a refractive index matching degree of the birefringent lens grating according to a comparison of a projection pattern image and a reference. In particular, the controller 37 is used to determine a matching degree of a first refractive index of a lens array substrate and a second refractive index of a liquid crystal material layer in the birefringent lens grating.

Figure 4:
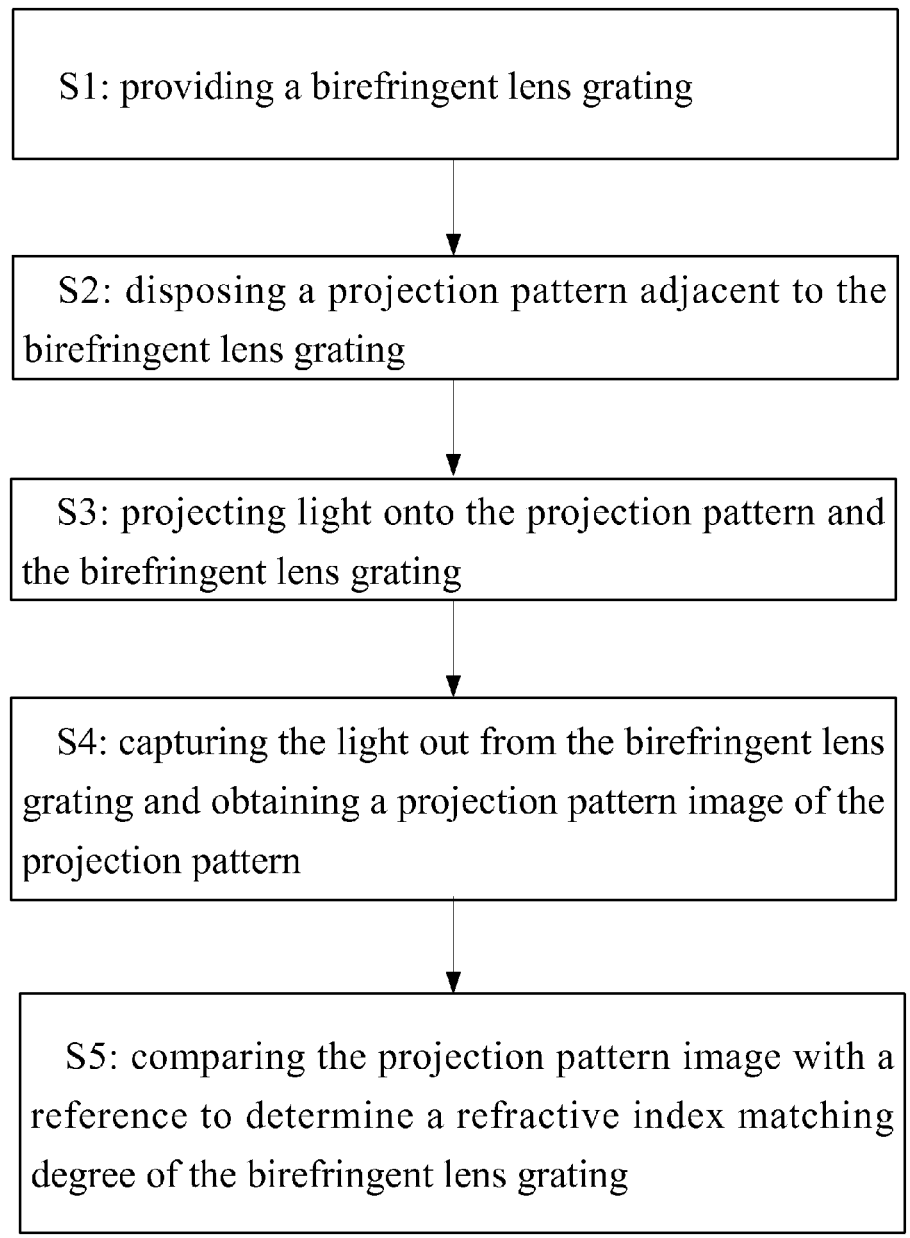
FIG. 4 is a flow chart of a detecting method of a birefringent lens grating according of a preferred embodiment of the present disclosure.

Referring to FIG. 4, a detecting method of a birefringent lens grating according to an embodiment of the present disclosure is shown. In this embodiment, the detecting method comprises steps S11-S15 which are substantially same with the steps S1-S5 shown in FIG. 2 except that a comparison of a projection pattern image and a reference is not further used to regulate a curing temperature and is used to determine a refractive index matching degree of the birefringent lens grating.

It will be apparent to those skilled in the art that the detecting device and method shown in FIG. 3 and FIG. 4 may be used to detect a refractive index matching degree of other birefringent lens gratings besides the birefringent lens grating 10 shown in FIG. 1.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A manufacturing device of a birefringent lens grating, the manufacturing device comprising:
    an object table for supporting the birefringent lens grating, wherein the birefringent lens grating includes a lens array substrate having a plurality of cylindrical grooves parallel to each other and a liquid crystal material layer contacting with the lens array substrate by filling into the plurality of cylindrical grooves;
    a curing radiation source for curing the liquid crystal material layer of the birefringent lens grating;
    a temperature regulator for regulating a curing temperature of the liquid crystal material layer;
    a projection pattern comprising an array of transmitting lines having a line pitch and a line width and disposed adjacent to the birefringent lens grating corresponding to the plurality of cylindrical grooves of the lens array substrate;
    an illuminating light source for projecting light onto the projection pattern, passing through the array of transmitting lines, and onto the birefringent lens grating;
    an image capturing device for capturing the light out from the birefringent lens grating and obtaining a projection pattern image of the projection pattern; and
    a controller for comparing an image width of the projection pattern image of the array of transmitting lines of the projection pattern with the line width of the transmitting lines to control the temperature regulator to regulate the curing temperature for the liquid crystal material layer according to the comparison of the image width of the projection pattern image with the line width of the transmitting lines.

2. The manufacturing device of claim 1, wherein the illuminating light source and the image capturing device are respectively arranged on opposite sides of the object table, and the projection pattern is arranged between the illuminating light source and the birefringent lens grating or between the birefringent lens grating and the image capturing device.

3. The manufacturing device of claim 2, wherein the object table is a transparent object table, the projection pattern is arranged between the transparent object table and the birefringent lens grating.

4. The manufacturing device of claim 3, wherein the projection pattern is arranged with a first aligning mark and the birefringent lens grating is arranged with a second aligning mark corresponding to the first aligning mark.

5. The manufacturing device of claim 1, wherein the plurality of transmitting lines are parallel to each other, the plurality of cylindrical grooves of the lens array substrate have a groove pitch, the liquid crystal material layer filled into the cylindrical grooves comprises a plurality of liquid crystal molecules aligned in an aligning direction, and the transmitting lines and the cylindrical grooves are arranged correspondingly.

6. The manufacturing device of claim 5, wherein the transmitting lines and the cylindrical grooves extend in a same extending direction, the line width of each of the transmitting lines is smaller than the groove pitch, and the line pitch is equal to the groove pitch.

7. The manufacturing device of claim 6, wherein the lens array substrate has a first refractive index to the light, the liquid crystal material layer has a second refractive index to the light, and the second refractive index has a refractive index difference before and after curing of the liquid crystal material layer.

8. The manufacturing device of claim 7, wherein the illuminating light source provides parallel light having a linear polarization direction and the controller is configured to detect that the light is parallel light having a linear polarization direction by determining that the image width of the projection pattern image is equal to the line width of the transmitting lines.

9. The manufacturing device of claim 7, wherein the controller is arranged to determine a matching degree of the first refractive index and the second refractive index and control the temperature regulator to regulate the curing temperature according to the matching degree.

10. The manufacturing device of claim 7, wherein the illuminating light source provides natural light and the controller is configured to detect the refractive index difference based on an intensity distribution of the projection pattern image.

11. A detecting device of a birefringent lens grating, the detecting device comprising:
  a projection pattern disposed adjacent to the birefringent lens grating, wherein the birefringent lens grating includes a lens array substrate having a plurality of cylindrical grooves parallel to each other and a liquid crystal material layer contacting with the lens array substrate by filling into the plurality of cylindrical grooves, and wherein the projection pattern comprises an array of transmitting lines having a line pitch and a line width and is disposed corresponding to the plurality of cylindrical grooves of the lens array substrate;
  an illuminating light source for projecting light onto the projection pattern, passing through the array of transmitting lines, and onto the birefringent lens grating;
  an image capturing device for capturing the light out from the birefringent lens grating and obtaining a projection pattern image of the projection pattern; and
  a controller for comparing an image width of the projection pattern image of the array of transmitting lines of the projection pattern with the line width of the transmitting lines to determine a refractive index matching degree of the birefringent lens grating according to the comparison of the image width of the projection pattern image with the line width of the transmitting lines.

12. The detecting device of claim 11, wherein the plurality of transmitting lines are parallel to each other, the lens array substrate of the birefringent lens has a first refractive index to the light and the liquid crystal material layer has a second refractive index to the light and contacts with the lens array substrate, the plurality of cylindrical grooves of the lens array substrate have a groove pitch, the liquid crystal material layer filled into the cylindrical grooves comprises a plurality of liquid crystal molecules aligned in an aligning direction, and the transmitting lines and the cylindrical grooves are arranged correspondingly.

13. The detecting device of claim 12, wherein the transmitting lines and the cylindrical grooves extend in a same extending direction, the line width of each of the transmitting lines is smaller than the groove pitch, and the line pitch is equal to the groove pitch.

* * * * *